United States Patent
Hickman et al.

(10) Patent No.: US 6,178,548 B1
(45) Date of Patent: Jan. 23, 2001

(54) BINARY CLASS LIBRARY WITH DEBUGGING SUPPORT

(75) Inventors: Kevin Paul Hickman, Coquitlam; Donald James McCrady, North York; William Sarantakos, Willowdale; Kevin Alexander Stoodley, Richmond Hill; Brian Ward Thomson, North York, all of (CA)

(73) Assignee: International Business Machines Corporation, Armonk, NY (US)

( * ) Notice: Under 35 U.S.C. 154(b), the term of this patent shall be extended for 0 days.

(21) Appl. No.: 08/992,876

(22) Filed: Dec. 17, 1997

(30) Foreign Application Priority Data

Dec. 24, 1996 (CA) ................................. 2194021

(51) Int. Cl.⁷ ........................................ G06F 9/45
(52) U.S. Cl. ..................... 717/4; 717/2; 717/10
(58) Field of Search ................... 395/701, 702, 395/703, 704, 708, 710, 712, 711; 707/103; 717/4, 10

(56) References Cited

U.S. PATENT DOCUMENTS

| | | | |
|---|---|---|---|
| 5,361,350 | * 11/1994 | Conner et al. | 707/103 |
| 5,367,683 | 11/1994 | Brett | 395/709 |
| 5,408,665 | 4/1995 | Fitzgerald | 395/710 |
| 5,421,016 | * 5/1995 | Conner et al. | 395/707 |
| 5,493,680 | * 2/1996 | Danforth | 395/702 |
| 5,560,009 | 9/1996 | Lenkov et al. | 395/704 |
| 5,579,520 | * 11/1996 | Bennett | 395/704 |
| 5,692,195 | * 11/1997 | Conner et al. | 709/305 |
| 5,771,385 | 6/1998 | Harper | 395/704 |
| 5,815,714 | 9/1998 | Shridhar et al. | 395/704 |
| 5,970,245 | * 2/2000 | Poteat et al. | 717/4 |
| 6,026,237 | * 2/2000 | Berry et al. | 717/4 |

FOREIGN PATENT DOCUMENTS

0777177A1  * 6/1997 (GB) ............... G06F/9/44

OTHER PUBLICATIONS

Kiczales & Lamping, "Issues in the design and sepcification of class libraries", OOPSLA–ACM, pp. 435–451, Sep. 1992.*

Gotwals et al., "pC++/streams: a library for I/O on complex distributed data structures", PPOPP–ACM, pp. 11–18, Jun. 1995.*

Helm & Maarek, "Integrating information retrival & domain specific approaches for browsing & retrieval in object oriented class libraries", OOPSLA–ACM, pp. 47–61, May 1991.*

Johnson et al., "HPC++ experiments with the parallel standard templets library", ACM ICS pp 124–131, May 1997.*

Nishanov et al, "Garbage collection in generic libraries", ACM SIMM pp 86–96, Mar. 1998.*

Forman et al, "Release to release binary compatability in SOM", Proc 10th conf. OOPSLA, pp 426–438, Sep. 1992.*

* cited by examiner

Primary Examiner—Kakali Chaki
Assistant Examiner—Anil Khatri
(74) Attorney, Agent, or Firm—Sawyer Law Group LLP; Prentiss Johnson

(57) ABSTRACT

A binary class library is adapted to provide full debugging type information particularly for use during program compilation in a minimal debug-generation mode. The library includes, a compile unit that #includes all the include files describing the classes that a given class library implements and exports. The compile unit also includes code defining a symbol with an external linkage. The resulting object module is put into the binary class library or a separate debug library. An inclusion direction and an external linkage symbol to the debug library are added to all include files for the class library that are #included by any program using its classes. These additions cause the compiler to direct the linker to add the debug library to the list of libraries from which it tries to resolve symbolic references, and to add a reference to the external linkage symbol that the linker will have to resolve by adding the debug library into the link.

17 Claims, 3 Drawing Sheets

BINARY CLASS LIBRARY WITH DEBUGGING SUPPORT

CROSS-REFERENCE TO RELATED APPLICATIONS

The present invention is related to co-pending U.S. patent application Ser. No. 08/992,527, entitled "MINIMIZING DEBUG INFORMATION FOR GLOBAL TYPES IN COMPILED LANGUAGES," filed Dec. 17, 1997, and assigned to the assignee of the present application.

FIELD OF THE INVENTION

The present invention is directed to a binary class library specially adapted to provide debugging information to fully support the debugging of its classes.

BACKGROUND OF THE INVENTION

Object-oriented programs are programs written in programming languages such as C++ that support a particular form of user-defined data types called "classes". A class "declaration" in the programming language specifies the data contained by variables of the class type, or operations supported by those variables, or both. Variables or instances of these class types are called objects.

A feature of C++ programming, and similar object oriented languages, is that its classes are stored in separate files, often grouped together into libraries. The source code that defines a class is commonly separated into a declaration part, contained in a "header file", and an implementation part, contained in a "body file". The header files contain important preprocessor directives; the preprocessor directive #include permits the header file to be referred to by the body file, after which declarations in the header file may be used in the body file. A header file will be referenced by its corresponding body file, but may also be referenced by one or more other body files that make use of the defined class.

A compiler converts the source language contained in a body file, plus all referenced header files, into an object module file containing machine code. An executable program is formed by a linker or linking loader which combines the object modules generated from several body files, and in doing so, resolves references from one object module to symbols representing subroutines and data definitions found in another.

While some errors in programs are so fundamental that they halt compilation, more often logical errors prevent the program from producing the results expected. Therefore, modern compiler suites generally include a software tool called a debugger that can be used to diagnose the program and trace these errors. To support the debugger, the compiler, under the control of an option, produces information describing the symbols and types in the program as well as information to map between source lines and the binary code output. This extra information enables the programmer to examine the types, variables and data structures by name and to follow the execution of the program through the source code. Current compilers, such as IBM's VisualAgeJ C++ for OS/27 Version 3.0, generate debug information in the following naive fashion. For every type referenced in the source for the compilation unit, a full description of that type is provided in the debug type information that is included in the resulting object module. If the same type is referenced in multiple body files, then a copy of that type description will be generated in each of the object modules. This duplication results from the fact that the compiler processes the body files one at a time, and therefore does not know whether a needed type description will be generated in some other object module. Because of the size of the debug information, this duplication can result in massive executable module sizes where the size of the debug information dwarfs all other aspects of the module. In addition, significant compile resources (time, working set, etc.) are devoted to the creation of this debug information so that widespread duplication represents a large degradation in the compile time needed to build the executable mode.

The prior art contains two approaches to ameliorating the module size and compile time problems.

One approach is to enhance the linker (or create a post link utility) to determine when multiple local type descriptions from different object modules are describing the same type and create a single global version of the type description (Global refers to the fact that it is accessible beyond the scope of a single object module's debug information). The link utility eliminates the duplicate local type descriptions and remaps all references to the global version of the type description. This approach solves the executable module size problem, but the object module size problem remains. Also, the compile time problem may actually be exacerbated by the link time cost of packing the debug type information.

The second approach is to enhance the compiler to emit full type descriptions only in the "distinguished compile unit" for that type. A heuristic commonly used to select a distinguished compile unit for a class is described in The Annotated C++ Reference Manual by Ellis & Stroustrup, 1990. The compile unit that contains the implementation of the lexically first non-inline virtual function member in that class is used as the distinguished compile unit. In other compile units that must reference the type that is fully described in the distinguished compile unit, a degenerate description of the type is emitted. The degenerate reference is a debug type record that does not describe the type but does provide a unique identifier for the type. Typically, the unique identifier is the fully qualified type name if the type is a global type. The degenerate reference also identifies itself as degenerate by some means so that it can be distinguished from a description of a global type of the same name that has no members. By relying on the single definition rule in C++ the debugger and/or the linker is able to replace references to the incomplete type with references to the full type description.

While this technique solves the compiler time and disk space problems, it is unable to handle a very common class of applications, those that use binary class libraries or classes implemented in code (dll files) that are dynamically linked without debugging information. Since the prior art method depends on emitting the full type information only in the distinguished compile unit for the type, it cannot produce a debuggable application when the source code of the distinguished compile unit is not part of the user's build process.

Class libraries currently shipped in binary do not usually include debugging information with them because their producers assume that the header files shipped with the libraries provide enough information to build debugging information using a standard compiler and debugger. Furthermore, full debug information for the library source that could be used in compiling debugging information for an application would not be limited to the information required to describe types. The source information would expose other information about the implementation of the class library that producers could be unwilling to make generally available to customers in the absence of source code licences.

SUMMARY OF THE INVENTION

It is therefore an object of the present invention to provide a technique to add full debugging type information to binary class libraries that can be used during compilation and linking of a program, particularly in a compiler enhanced to emit minimal debugging type information.

A further object of the invention is to provide a single compile unit containing all necessary debugging information for a C++ link library (class library), referenced from any other object modules for the program generated by the compiler.

Accordingly, in one aspect, the present invention provides a library suite with debugging information for a binary class library. The suite includes an object module with full debugging type information for all classes that the library implements and exports, and a mechanism for providing external linkage between the object module and a program referencing at least one class in the library. Whether the object module is located in a dynamic or static link library, preferably, it defines an external symbol, and the header files in the binary class library each includes a control initializer, if needed to cause a compiler to direct a linker to add the library with the object module to the linker and a reference to the external symbol. Preferably, the control initializer is a source text that causes the compiler to direct the linker toward the library with the object module containing the full debugging information and to create a reference to an external symbol defined in the object module.

The invention also provides a method for creating an object module containing full debugging type information for all types declared in header files in a binary class library. According to the method, a body file is created that includes all the header files and an external linkage symbol to the object module. The body file is compiled to produce the object module.

BRIEF DESCRIPTION OF THE DRAWINGS

Embodiments of the invention will now be described in detail in association with the accompanying drawings, in which.

DETAILED DESCRIPTION OF THE PREFERRED EMBODIMENTS

As discussed above, conventional compilers either provide full debugging information for referenced classes, or debugging information is emitted for referenced classes only if compiling the "distinguished compile unit". If the header files contain material that is never referred to, no debugging information is generated for it.

Our concurrently filed U.S. patent application titled MINIMIZING DEBUG INFORMATION FOR GLOBAL TYPES IN COMPILED LANGUAGES Ser. No. 08/992, 527 describes an additional mode for compiling objects containing debugging information in which the compiler generates debugging information for all types whether they are referenced or not and regardless of whether the unit being compiled is the distinguished compile unit for that type.

According to the present invention, the builder of a binary class library can utilize this by:

i) creating an object file containing all debug information for the full range of types implemented and exported in the class library; and ii) modifying the header files that describe the interface to users of the class library so that the debugging information created in i) above is always available whenever types implemented in the class library are referenced in the user's source code during compilation.

Figure 1:
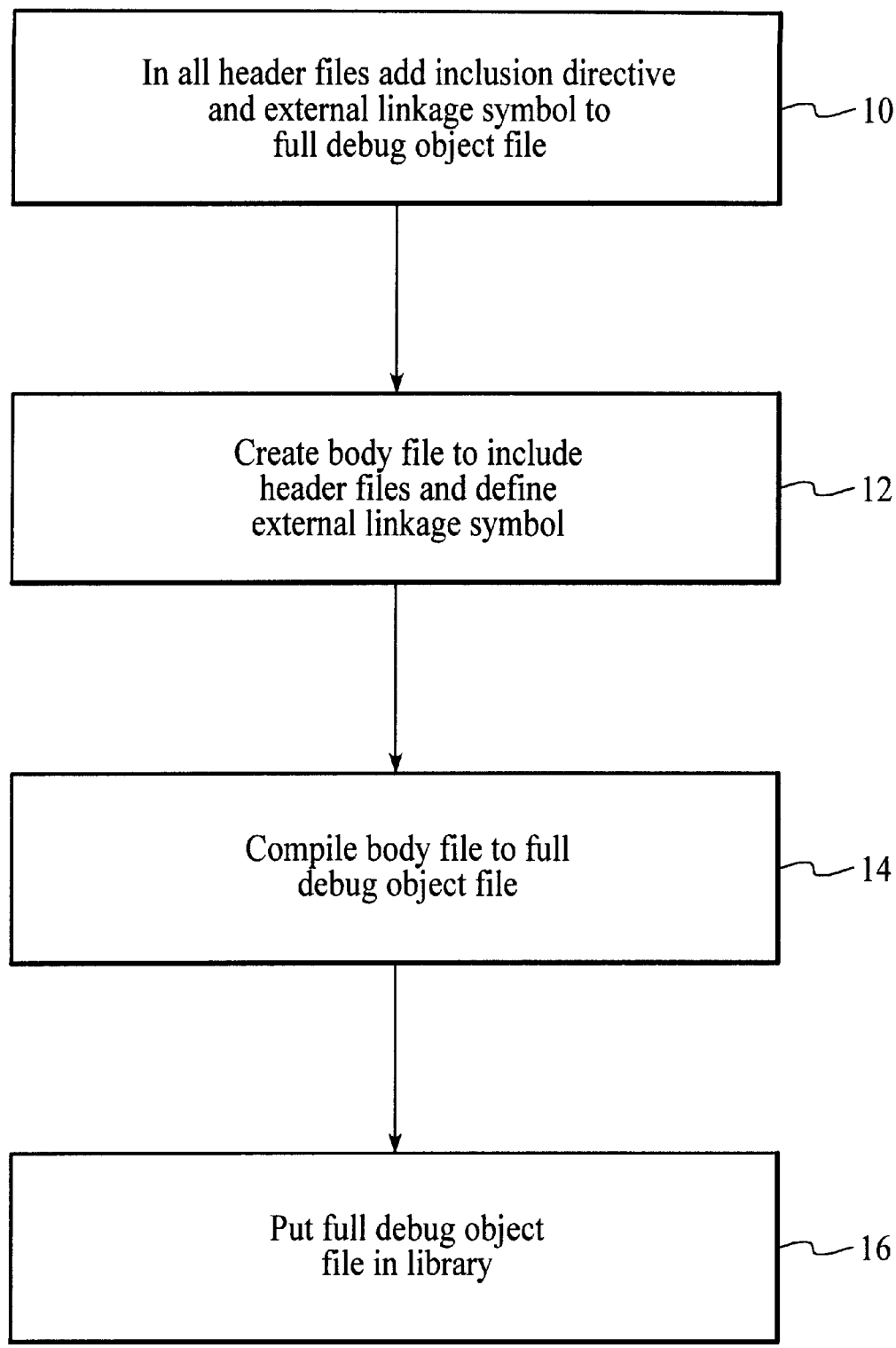
FIG. 1 is a flow diagram illustrating the steps by a class library builder or by a user of the class library for creating an object module containing full debugging information for all types in a library, according to the preferred embodiment of the invention.

A preferred method for achieving this, according to the preferred embodiment, is illustrated in the flow diagram of FIG. 1.

First, in block 10, all header files in the class library that describe the interface to users of the class library, are modified by adding:

i) a pragma that will direct the linker to add the static link library containing the object module with the full debug type information for the types implemented in the class library into the link whenever the header file is included in the user's source; and ii) a reference to an externally defined symbol (to be defined in the object containing the full debug information) that will force the linker to add the object file containing the full debug information.

For example, in a C++ class library of the preferred embodiment, inserting the following code fragment into each header file will accomplish the desired result:

```
#if defined(__MIN_DEBUG__)
#pragma library(dbuginfo.lib)
#pragma reference(ClassLibraryTypeInfo)
#endif
```

In this code fragment, __MIN_DEBUG__ is a macro that is reserved by the compiler and defined when the minimized debugging information mode is activated.

The "#pragma library" line causes the compiler to embed a control directive in the object module which in turn directs the linker to add a library (dbuginfo.lib, in this case) to the list of libraries from which it tries to resolve symbolic references. The added library would contain the object module where the full debug information can be found.

The pragma reference directs the compiler to put a reference to the named symbol (ClassLibraryTypeinfo, in this case) into the object module so that the linker will be forced to include the debug object which defines that symbol, in order to satisfy the reference.

Second, a body file is created to #include the header files and to declare and initialize the external linkage symbol (called ClassLibraryTypeInfo in the code fragment set out above) referenced in the header files (block 12). The body file is compiled using the option in the compiler for producing full debugging information, the option that creates type descriptions for types even if they are not referenced (block 14).

The specific names used above are only to illustrate the example. Any name, unique in the context could also be used.

The resulting object module is put into a static library named to agree with the name given in the #pragma library( ) statement of the code fragment (block 16). This can be an existing link library or a separate link library, at the discretion of the provider of the binary class library.

Once the full object debug file is accessible, the minimum debug feature in the compiler can be used. A preferred compilation and linking technique using the debug object module is the subject of our concurrently filed application described above. This technique is described below.

When the compiler is compiling header files that describe the classes in the class library in the minimum debug mode, it will compile the #pragma library( ) and pragma reference statements. The compiler will then put directives in the object module that tell the linker to find dbuginfo.lib and to resolve a reference to the symbol ClassLibraryTypeInfo. When the linker processes the object so produced, it will be forced to add the object module containing the full debug information to the link.

Figure 2:
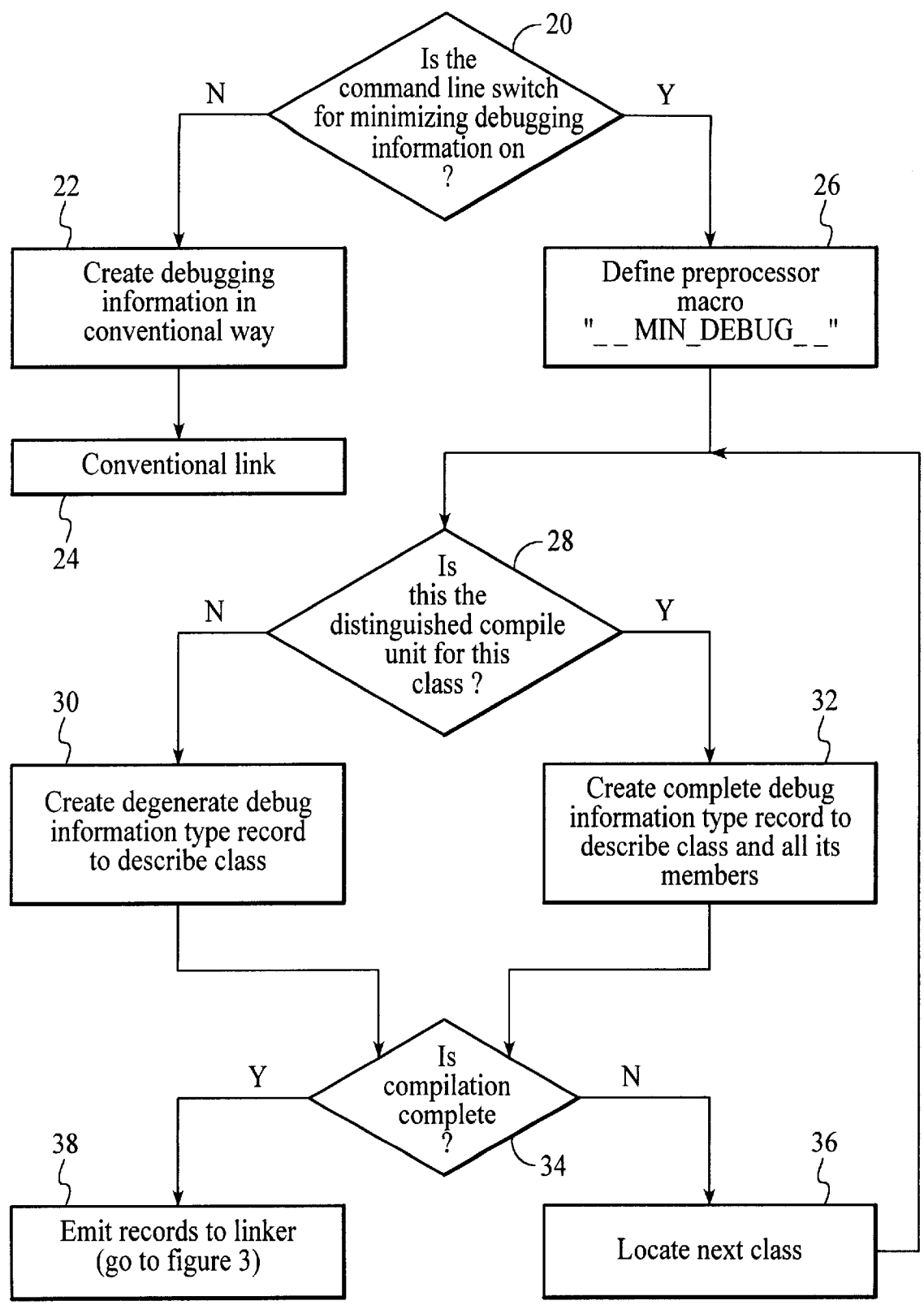
FIG. 2 is a flow diagram illustrating the follow-on steps taken in the compiler in order to generate minimal debugging information to the linker.

This is illustrated in the flow diagram of FIG. 2.

The compiler is enhanced to operate in the minimum debugging mode on detecting the command line switch (block 20). In the absence of that, it will compile debugging code in the conventional manner discussed above, emitting type information in each compile unit that refers to that type (block 22). The link will also be according to convention (block 24); since there are no references to the debugging information library for the class library nor to any symbol that is defined in that library, the link does not result in errors and all debugging information comes from the objects themselves.

When the switch for implementing minimum debugging information is detected (block 20), the compiler first defines the preprocessor macro __MIN_DEBUG__ (block 26). Because this macro symbol is defined, the code fragment added to each header file by the class library builder causes a reference to "ClassLibraryTypeInfo" to be added to each module created by the compiler that includes one of these header files, and a directive is passed to the linker, via the object module, to make it add the "dbuginfo.lib" library to its list of default libraries in the link. The references to "ClassLibraryTypeInfo" are satisfied by the linker when it brings in the object module containing the complete debug information descriptions for the class library (built by the class library builder as described in FIG. 1) which also contains the definition of the symbol "ClassLibraryTypeInfo".

For each reference to a class in the program, the compiler determines whether the module it is compiling is the distinguished compile unit for the class (block 28, FIG. 2). If it is not, the compiler generates only degenerate debug information type records (degenerate references) to describe the class (block 30). If the class is the distinguished compile unit, the compiler creates complete debug information records to describe the class and all its members (block 32).

Figure 3:
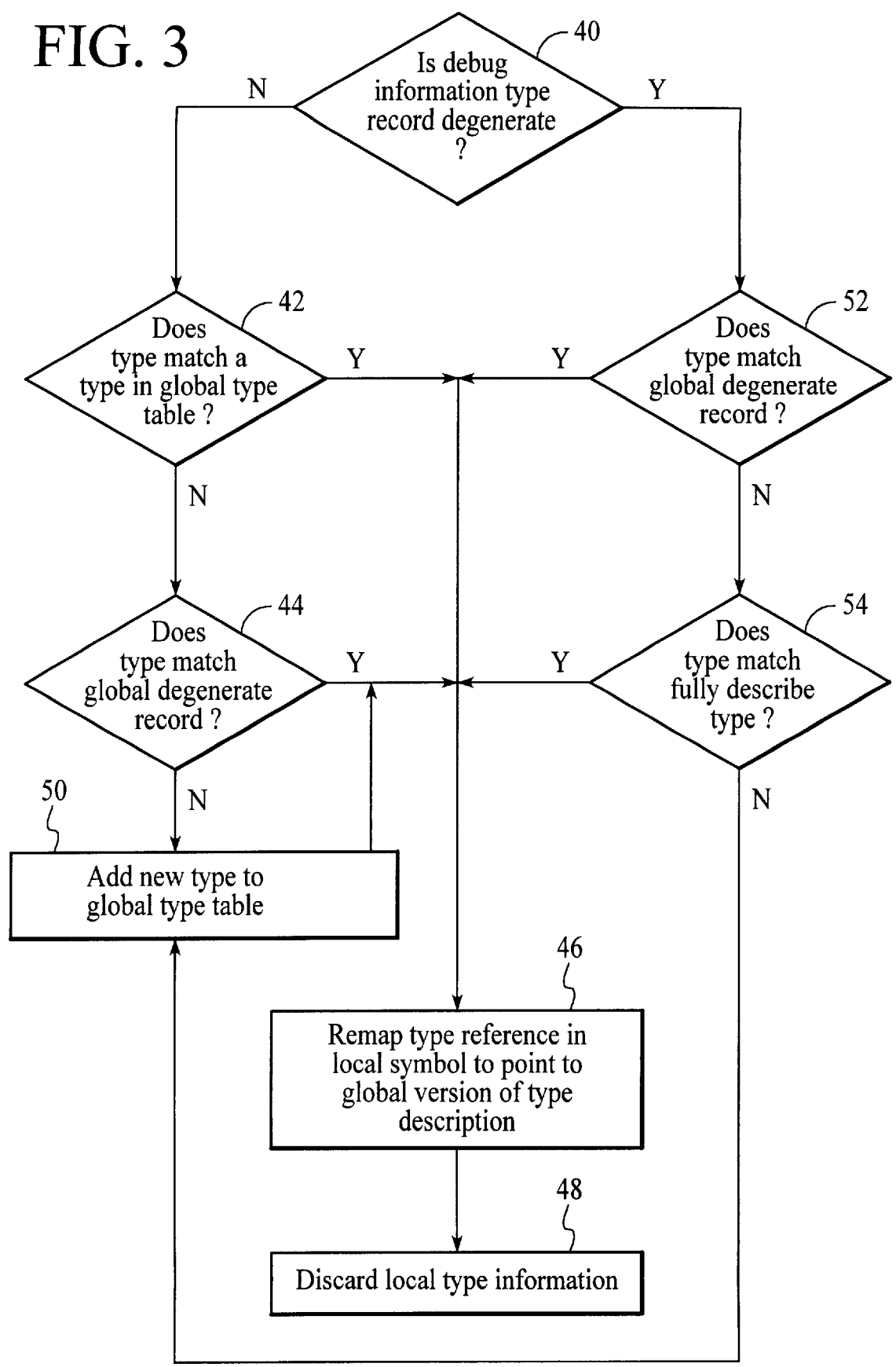
FIG. 3 is a flow diagram illustrating the steps taken in the linker to generate a single set of comprehensive debugging information from the minimal debugging information records provided by the compiler.

This process continues (blocks 34, 36) until the compilation is complete and the records are emitted to the linker (block 38). The debug packing feature in the linker matches up the degenerate references to types in the compile units with the full descriptions of those types found in the full debug object module, following the steps illustrated in FIG. 3.

Once the debug type index packing tool has been enabled at link time, the linker examines each type record in the debug type information to determine whether the record is degenerate (block 40).

Where the debug information type record is not a degenerate record, it must be matched to a global type. To match the record to a global type (block 42), either a match of the parent type (i.e., class) and all sibling records or a match of the parent to a global degenerate record must be located (block 44). If the match is successful, the type references are remapped in local symbols to point to the global version of the type description (block 46) and the local type descriptions are discarded (block 48).

If the match is not successful, a new type must be added to the global variable table (block 50) so that the local references can be remapped from the local type to use the global type instead (blocks 46, 48).

Where the debug information type record is a degenerate reference, a match to a global type must be located, either to match to a global degenerate type record of the same name and type (block 52) or to a fully described type with the same type and name (block 54). If the match is successful, then the type reference in the local symbol is remapped to point to the global version of the type description (block 46) and the local symbol is discarded (block 48). If not, then a new type must be added to the global type table (block 50) so that the local symbol can be remapped to a global version and the local type description discarded (blocks 46, 48).

The resulting executables and objects containing debugging information are of minimum size, and the compilation cost of producing the debugging information is drastically reduced.

In order to demonstrate these advantages of the use of the present invention, a simple test was conducted. A directory containing six pre-compiled object modules with a number of header files from a visual builder tool was built in an IBM OS/2 system (50 MHz 486 24 MB).

The first test build was done without any debugging information being compiled currently, to establish a calibration.

Test 1:

| Start | 17:33:23 | |
|---|---|---|
| End | 17:35:21 | |
| Duration | 1:58 seconds | |
| 5:33 pm | 18061 bytes | A.obj |
| 5:33 pm | 6418 | B.obj |
| 5:34 pm | 4963 | C.obj |
| 5:34 pm | 38569 | D.obj |
| 5:35 pm | 9739 | E.obj |
| 5:35 pm | 1953 | F.obj |
| 6 files | 79703 bytes used | |

The second test build was performed with the conventional debugging information option activated.

Test 2:

| Start | 17:35:22 | |
|---|---|---|
| End | 17:37:48 | |
| Duration | 2:26 seconds | |
| 5:35 pm | 118750 bytes | A.obj |
| 5:36 pm | 72639 | B.obj |
| 5:36 pm | 41719 | C.obj |
| 5:36 pm | 219691 | D.obj |
| 5:37 pm | 109410 | E.obj |
| 5:37 pm | 26131 | F.obj |
| 6 files | 588340 bytes used | |

In the third build, the minimum debugging option of the present invention was activated.

Test 3:

| Start | 17:37:49 | |
|---|---|---|
| End | 17:39:51 | |
| Duration | 2:02 seconds | |
| 5:38 pm | 49238 bytes | A.obj |
| 5:38 pm | 25241 | B.obj |
| 5:38 pm | 18201 | C.obj |
| 5:39 pm | 102882 | D.obj |
| 5:39 pm | 37052 | E.obj |
| 5:39 pm | 8605 | F.obj |
| 6 files | 241219 bytes used | |

From the foregoing, it can be seen that the second build, using the conventional debug information compilation technique added 25% to build time and 640% to object size, while the minimum debug collection option of the present invention reduced the time increase to 4% and the object size increase to 200%.

As an alternative to the above described preferred embodiment, the library could be eliminated for any cases where the class library itself is only in one library file. However, this would not be as effective for an operating system, such as IBM's OS/2, in which support for both static and dynamic linking is required and where there would be a library for static linking and an import library for dynamic linking. Two copies of the large full debugging information would also be required.

Also, the reference could be implemented simply as:

extern int ClassLibraryTypeInfo

This could not be used, however, in a compiler that has been enhanced to remove false references to avoid drawing unnecessary objects into the link without further enhancement. For example, if the back end of the compiler has been modified to permit removal of references only where the code or data artifacts that make the references are also removed, then references having no code or data artifacts referring to them in the first place will not be removed. The reference cited above would have no code or data artifacts, and it would not be removed.

Further modifications to the invention that would be obvious to those skilled in the art are intended to be covered within the scope of the appended claims.

What is claimed is:

1. A library suite for providing debugging information for a class library in the suite the library suite comprising:

the class library, the class library or a plurality of classes in the class library capable of being dynamically linked without full debugging information;

an object module containing the full debugging type information for the plurality of classes implemented and exported by the class library, the object module being in a library; and a mechanism for providing external linkage between the object module and a program referencing at least one class of the plurality of classes in the class library.

2. The library suite of claim 1 wherein:

the class library is a dynamic link library and the library is a separate dynamic link library;

the object module defines an external symbol; and a header file in the class library includes a control initializer to cause a compiler to direct a linker to add the separate dynamic link library into a link and a reference to the external symbol.

3. The library suite of claim 1 wherein:

the class library is a dynamic link library and is the same as the library;

the object module defines an external symbol; and a header file in the class library includes a control initializer to cause a compiler to direct a linker to add the dynamic link library into a link and a reference to the external symbol.

4. The library suite of claim 1 wherein:

the class library is a dynamic link library and the object module is in a linker import library;

the object module defines an external symbol; and each header file in the binary class library includes a reference to the external symbol.

5. The library suite of claim 1 wherein:

the class library is a static link library and the library is a separate static link library;

the object module defines an external symbol; and each header file in the class library includes a control initializer to cause a compiler to direct a linker to add the separate static link library into the link and a reference to the external symbol.

6. The library suite of claim 1 wherein:

the class library is a static link library that includes the object module;

the object module defines an external symbol; and a header file in the class library includes a control initializer to cause a compiler to direct a linker to add the static link library to the link and a reference to the external symbol.

7. The library suite of claim 1 further comprising:

a duplicate copy of the object module; and wherein:

the library is a linker import library and the duplicate copy is in a static link library; and a header file in the class library includes a control initializer to cause a compiler to add the static link library into the link and a reference to the external symbol.

8. The library suite of claim 1 wherein the class library further comprises a binary class library.

9. A library suite for providing debugging information for a class library in the suite the library suite comprising:

an object module containing the full debugging type information for the plurality of classes implemented and exported by the class library, the object module being in a library, the object module defining an external symbol; and a mechanism for providing external linkage between the object module and a program referencing at least one class of the plurality of classes in the class library, the mechanism including a header file in the class library that includes a control initializer to cause a compiler to direct a linker to add the separate dynamic link library into a link and a reference to the external symbol, wherein the control initializer comprises a source text to cause a compiler to direct a linker toward the library and to create a reference to the external symbol defined in the object module.

10. A library suite for providing debugging information for a class library in the suite, the class library or a plurality of classes in the class library being dynamically linked without full debugging information, the library suite comprising:

an object module containing the full debugging type information for the plurality of classes implemented and exported by the class library, the object module being in a library; and a mechanism for providing external linkage between the object module and a program referencing at least one class of the plurality of classes in the class library, the mechanism including a header file in the class library that includes a control initializer to cause a compiler to direct a linker to add the dynamic link library into a link and a reference to the external symbol;

wherein the class library is a dynamic link library and is the same as the library;

wherein the control initializer comprises a source text to cause a compiler to direct a linker toward the library and to create a reference to the external symbol defined in the object module.

11. A library suite for providing debugging information for a class library in the suite the library suite comprising:

an object module containing the full debugging type information for the plurality of classes implemented and exported by the class library, the object module being in a library, object module defining an external symbol, the class library being a static link library and the library being a separate static link library; and a mechanism for providing external linkage between the object module and a program referencing at least one class of the plurality of classes in the class library, the mechanism including a plurality of header files in the class library, each of the plurality of header files in the class library including a control initializer to cause a compiler to direct a linker to add the separate static link library into the link and a reference to the external symbol;

wherein the control initializer comprises a source text to cause the compiler to direct a linker toward the library and to create a reference to the external symbol defined in the object module.

12. A library suite for providing debugging information for a class library in the suite the library suite comprising:

an object module containing the full debugging type information for the plurality of classes implemented and exported by the class library, the object module being in a library, the class library being a static link library that includes the object module, the library being the same as the class library, the object module defining an external symbol; and a mechanism for providing external linkage between the object module and a program referencing at least one class of the plurality of classes in the class library, the mechanism including a header file in the class library that includes a control initializer to cause a compiler to direct a linker to add the static link library to the link and a reference to the external symbol;

wherein the control initializer comprises a source text to cause the compiler to direct a linker toward the library and to create a reference to the external symbol defined in the object module.

13. A library suite for providing debugging information for a class library in the suite the library suite comprising:

an object module containing the full debugging type information for the plurality of classes implemented and exported by the class library, the object module being in a library;

a mechanism for providing external linkage between the object module and a program referencing at least one class of the plurality of classes in the class library, the mechanism including a header file in the class library that includes a control initializer to cause a compiler to add the static link library into the link and a reference to the external symbol a duplicate copy of the object module; and wherein the library is a linker import library and the duplicate copy is in a static link library, and wherein the control initializer comprises a source text to cause the compiler to direct a linker toward the library and to create a reference to the external symbol defined in the object module.

14. A method for creating an object module containing full debugging type information for a plurality of types declared in a plurality of header files in a class library, the method comprising the steps of:

including in the plurality of header files a reference to an external linkage system and a directive to add a library;

creating a body file that includes the plurality of header files and provides a definition of the external linkage symbol;

compiling the object module from the body file to produce the full debugging type information for the plurality of types or the class library the plurality of types or the class library capable of being dynamically linked without the full debugging information; and placing the object module in the library.

15. The method of claim 14 wherein the library is separate from the class library.

16. The method of claim 15 wherein the class library further comprises a binary class library.

17. A library suite comprising:

a class library in the library suite, the class library including a plurality of classes, the plurality of classes or class library capable of being dynamically linked without full debugging information;

a plurality of header files for the plurality of classes, each of the plurality of header files including a reference to an external linkage symbol and a directive to add a library; and an object module in the library and including full debugging type information for the class library, the object module being compiled from a body file including a definition of the external linkage symbol and the plurality of header files.

* * * * *